(12) United States Patent
Yoo (10) Patent No.: US 9,924,009 B2
(45) Date of Patent: Mar. 20, 2018

(54) METHOD AND APPARATUS FOR CONTROLLING CALL ANSWER AND MOBILE TERMINAL USING THE SAME

(71) Applicant: COUCHGRAM CO., LTD., Seongnam-si, Gyeonggi-do (KR)

(72) Inventor: Soo Geun Yoo, Yongin-si (KR)

(73) Assignee: COUCHGRAM CO., LTD., Seongnam-si (KR)

( * ) Notice: Subject to any disclaimer, the term of this patent is extended or adjusted under 35 U.S.C. 154(b) by 74 days.

(21) Appl. No.: 14/842,424

(22) Filed: Sep. 1, 2015

(65) Prior Publication Data

US 2016/0112555 A1   Apr. 21, 2016

(30) Foreign Application Priority Data

Oct. 15, 2014 (KR) .................. 10-2014-0139365

(51) Int. Cl.
| | |
|---|---|
| *H04W 88/02* | (2009.01) |
| *H04M 1/57* | (2006.01) |
| *H04M 1/725* | (2006.01) |
| *H04M 1/663* | (2006.01) |

(52) U.S. Cl.
CPC ............ *H04M 1/57* (2013.01); *H04M 1/725* (2013.01); *H04M 1/72519* (2013.01); *H04M 1/663* (2013.01); *H04M 1/72536* (2013.01); *H04M 2250/22* (2013.01)

(58) Field of Classification Search
CPC .................................................. G06F 3/04883
USPC .................................. 715/154, 863; 345/156
See application file for complete search history.

(56) References Cited

U.S. PATENT DOCUMENTS

| | | | | |
|---|---|---|---|---|
| 7,937,116 | B2* | 5/2011 | Sano | H04M 1/663 455/414.1 |
| 8,552,996 | B2* | 10/2013 | Morita | G06F 3/04883 178/18.03 |
| 8,640,057 | B2* | 1/2014 | Chaudhri | G06F 3/04883 345/15 |
| 2009/0247143 | A1* | 10/2009 | Hayashi | H04M 1/663 455/418 |
| 2010/0262928 | A1 | 10/2010 | Abbott | |

(Continued)

FOREIGN PATENT DOCUMENTS

| | | |
|---|---|---|
| JP | 2012095070 A | 5/2012 |
| JP | 2013080997 A | 5/2013 |

(Continued)

*Primary Examiner* — Vladimir Magloire
*Assistant Examiner* — Majid Syed
(74) *Attorney, Agent, or Firm* — Hauptman Ham, LLP (57) ABSTRACT

An apparatus for controlling answering a call includes a display unit configured to display an incoming call icon when receiving a call signal, the incoming call icon differing from a call answer icon and a call end icon of a normal incoming call screen, a touch screen configured, upon the display unit displaying the incoming call icon, to receive an input of a predetermined operation with respect to the incoming call icon from a user, and a control unit including a call-permission processing unit configured to compare the predetermined operation with a preset call permission operation set in advance with respect to the incoming call icon and to permit answering the call when the predetermined operation matches the preset call permission operation.

16 Claims, 11 Drawing Sheets

(56) References Cited

U.S. PATENT DOCUMENTS

| | | | |
|---|---|---|---|
| 2012/0052920 A1* | 3/2012 | Kobayashi | H04M 1/72519 455/566 |
| 2013/0033436 A1 | 2/2013 | Brinda et al. | |
| 2013/0106742 A1* | 5/2013 | Lee | G06F 3/0484 345/173 |
| 2013/0172053 A1* | 7/2013 | Chen | H04M 1/0202 455/566 |
| 2013/0305240 A1* | 11/2013 | Narendra | H04M 1/72525 717/176 |
| 2015/0117444 A1* | 4/2015 | Sandblad | H04L 65/1059 370/352 |

FOREIGN PATENT DOCUMENTS

| | | |
|---|---|---|
| JP | 2013093699 A | 5/2013 |
| JP | 2013131106 A | 7/2013 |
| JP | 2014150375 A | 8/2014 |
| KR | 1020090000278 A | 1/2009 |
| KR | 1020100042400 A | 4/2010 |
| KR | 1020120024449 A | 3/2012 |
| KR | 1020130090964 A | 8/2013 |

\* cited by examiner

METHOD AND APPARATUS FOR CONTROLLING CALL ANSWER AND MOBILE TERMINAL USING THE SAME

CROSS REFERENCE TO RELATED APPLICATION

This application claims the benefit of Korean Patent Application No. 10-2014-0139365 filed with the Korean Intellectual Property Office on Oct. 15, 2014, the disclosure of which is incorporated herein by reference.

BACKGROUND

1. Field

The present disclosure relates to a method and an apparatus for controlling answering a call and a mobile terminal using the same.

2. Description of the Related Art

In general, a mobile communication terminal (hereinafter, a "mobile terminal") refers to a communication device that can be used to perform a communication of voice, video, data, and the like virtually in any place via a wireless communication network.

An example of such a mobile terminal includes a smartphone, which is a highly functional mobile terminal that provides functions of running a program, performing a data communication, connecting to a personal computer (PC), and the like. The smartphone is a hybrid-type wireless communication device having features of a mobile phone and a personal digital assistant (PDA), in which the function of the PDA is incorporated into the mobile phone, in general. The smartphone has come into wide use because it provides PC connection, personal information management, wireless Internet, and the like, as well as voice call.

Recently, with the advance of the mobile terminal, a social problem may happen due to leakage of technical information and personal information, which caused increased concern about protection of privacy.

Korean Patent Application Laid-Open No. 10-2009-0000278 describes a method and an apparatus for controlling incoming call in a mobile communication system.

SUMMARY

An apparatus for controlling answering a call, according to some embodiments of the present invention, includes a display unit configured to display an incoming call icon when receiving a call signal, the incoming call icon differing from a call answer icon and a call end icon of a normal incoming call screen, a touch screen configured, upon the display unit displaying the incoming call icon, to receive an input of a predetermined operation with respect to the incoming call icon from a user, and a control unit including a call-permission processing unit configured to compare the predetermined operation with a preset call permission operation set in advance with respect to the incoming call icon and to permit answering the call when the predetermined operation matches the preset call permission operation.

A mobile terminal, according to some embodiments of the present invention, includes the above mentioned apparatus.

A method of controlling answering a call, according to some embodiments of the present invention, includes displaying an incoming call icon when receiving a call signal, the incoming call icon differing from a call answer icon and a call end icon of a normal incoming call screen, receiving, upon the display unit displaying the incoming call icon, an input of a predetermined operation with respect to the incoming call icon from a user, comparing the predetermined operation with a preset call permission operation set in advance with respect to the incoming call icon, and permitting answering the call when the predetermined operation matches the preset call permission operation.

The above and other objects, features, advantages and technical and industrial significance of this disclosure will be better understood by reading the following detailed description of exemplary embodiments of the disclosure, when considered in connection with the accompanying drawings.

DETAILED DESCRIPTION OF THE PREFERRED EMBODIMENTS

Exemplary embodiments of the present disclosure are described in detail below with reference to the accompanying drawings.

A smartphone, which is a common mobile terminal these days, may have a security problem when there is an incoming call during the owner's absence, because any one can answer the call by performing a call-answer operation on an incoming call screen.

For this reason, a call security problem needs to be solved by disabling anyone other than the owner to answer the call.

The present invention has been achieved in view of the above aspects, and it is an object of some embodiments of the present invention to provide a call-answer control apparatus, a call-answer control method, and a mobile terminal, which are capable of disabling anyone other than the owner of a mobile terminal to answer a call even when there is an incoming call while the owner's absence.

Figure 1:
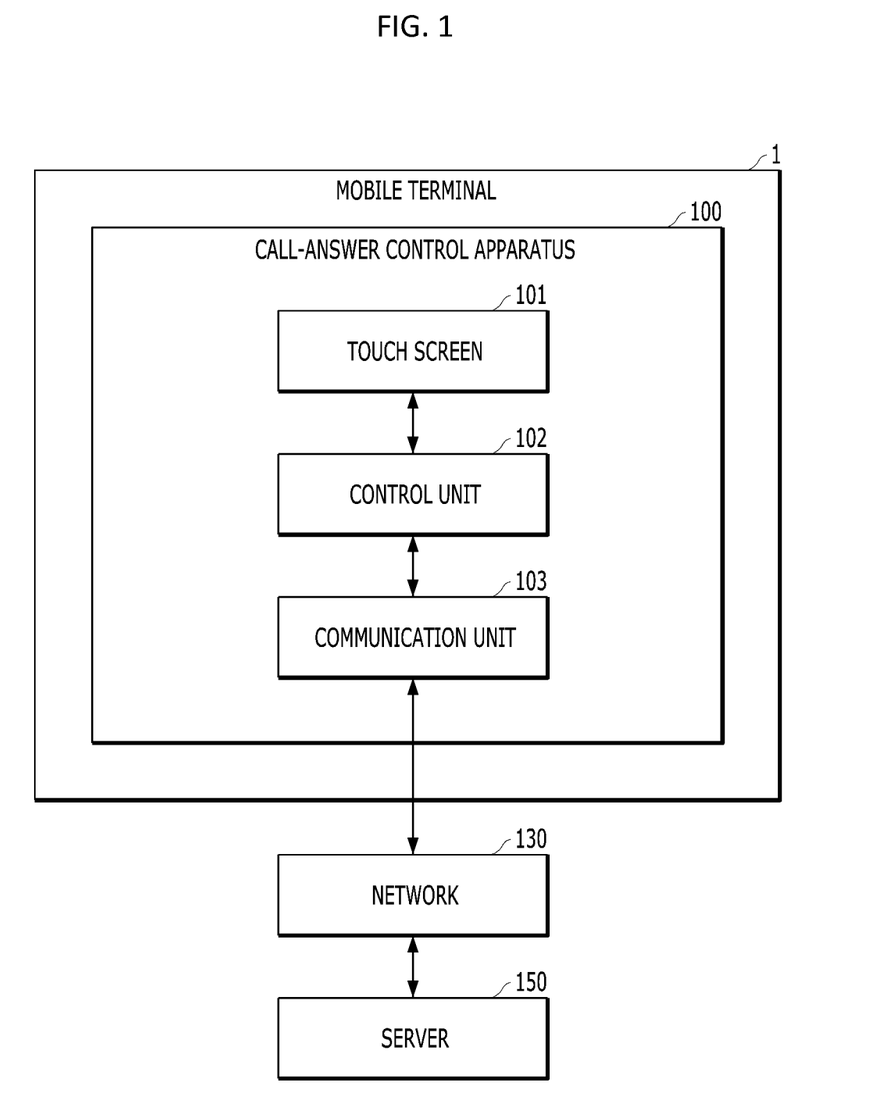
FIG. 1 is a block diagram of a call-answer control apparatus according to some embodiments of the present invention.

FIG. 1 is a block diagram of a call-answer control apparatus 100 according to some embodiments of the present invention.

As shown in FIG. 1, a mobile terminal 1 including the call-answer control apparatus 100 according to some embodiments is connected to a server 150 via a network 130.

The call-answer control apparatus 100 includes a touch screen 101, a control unit 102, and a communication unit 103. The control unit 102 can be a processor or a central processing unit (CPU) or a module implemented in the processor or the CPU.

The touch screen 101 includes a display unit (not shown) and a touch sensor (not shown) that senses a touch operation. The display unit can be used as an input device as well as an output device. The touch sensor includes any one of a touch film, a touch sheet, a touch pad, or the like.

The touch sensor converts a pressure applied on a specific portion of the display unit or a change of capacitance generated at a specific portion of the display unit into an electrical input signal. The touch sensor is configured to sense not only position an area of a touch but also pressure of the touch.

When there is a touch input on the touch sensor, a signal corresponding to the touch input is sent to a touch control unit (not shown). The touch control unit processes the signal and sends obtained data to the control unit 102. Bases on this operation, the control unit 102 determines an area of the display unit where the touch has performed.

That is, the touch screen 101 includes the display unit that outputs an incoming call screen or the like and the touch sensor and the touch control unit that receives an input of an operation such as a drag operation and transfers the received input to the control unit 102.

The communication unit 103 includes at least one module that enables a communication between the mobile terminal 1 and a base station (not shown) for sending or receiving a call or between the mobile terminal 1 and the network 130 where the mobile terminal 1 is located. For example, the communication unit 103 includes a mobile communication unit, a short-distance communication unit, and a wireless Internet unit.

The mobile communication unit transmits and receives a wireless signal with respect to at least one of a base station, an external terminal, or a server in a mobile communication network. The wireless signal includes a voice call signal, a video call signal, and various types of data according to transmission and reception of a text message or a multimedia message.

The wireless Internet unit refers to a module for a wireless Internet connection, which employs WLAN (Wireless LAN) (Wi-Fi), Wibro (Wireless broadband), Wimax (World Interoperability for Microwave Access), HSDPA (High Speed Downlink Packet Access), or the like.

The short-distance communication unit refers to a module for a short range communication, which employs Bluetooth, RFID (Radio Frequency Identification), IrDA (Infrared Data Association), UWB (Ultra Wideband), Zigbee, or the like.

Figure 2:
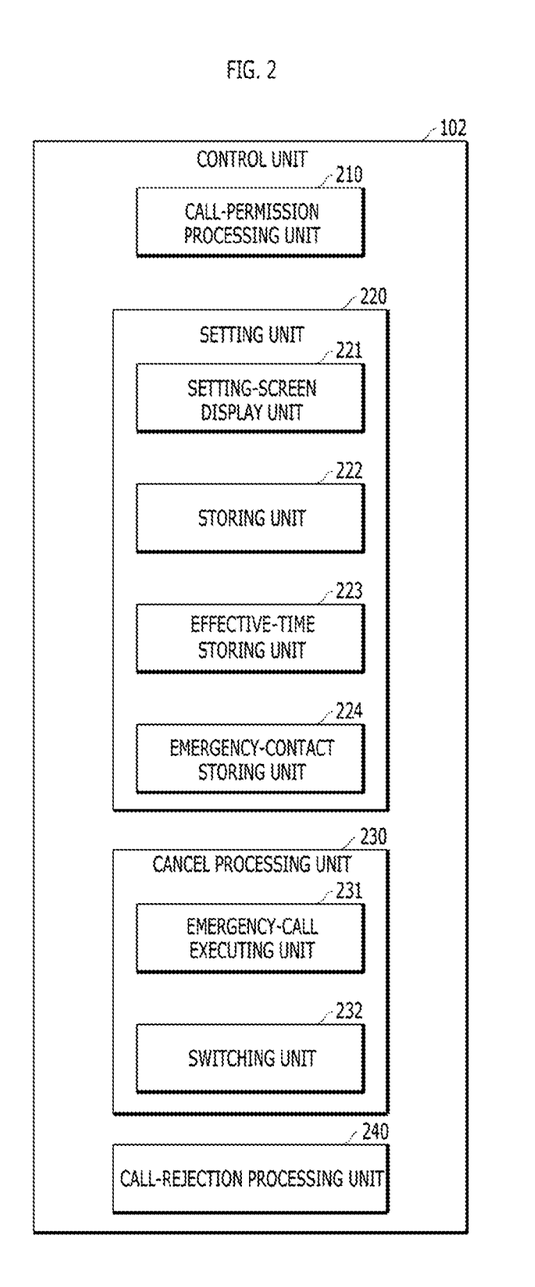
FIG. 2 is a block diagram of a control unit of the call-answer control apparatus shown in FIG. 1.

FIG. 2 is a block diagram of the control unit 102 of the call-answer control apparatus 100.

As shown in FIG. 2, the control unit 102 includes a call-permission processing unit 210, a setting unit 220, a cancel processing unit 230, and a call-rejection processing unit 240.

The touch screen 101 according to some embodiments displays an incoming call icon (security call button) when receiving a call, and receives an input of a predetermined operation (e.g., a drag operation) from a user. The incoming call icon (security call button) is "an icon according to some embodiments of the present invention" different from a call button and a call-end button typically displayed on a normal incoming call screen. In some embodiments, the incoming call icon is displayed on the normal incoming call screen together with the call button and the cal-end button, and in some embodiments, the incoming call icon is display alone instead of the normal incoming call screen.

The call-permission processing unit 210 receives an input of a predetermined operation from a user when there is an incoming call, compares the predetermined operation with an operation for answering the call stored in advance in a storing unit 222 of the setting unit 220 (hereinafter, a "call permission operation"), and determines whether or not to permit answering the call based on a result of the comparison.

In some embodiments, the predetermined operation inputted on the incoming call screen by the user includes at least one of touch, drag, tapping, or flipping with a predetermined pattern starting from the incoming call icon.

In some embodiments, the predetermined pattern includes at least one of time, cycle, direction, speed, or strength of performing the at least one of the touch, the drag, the tapping, or the flipping.

When the call permission operation is a drag operation, a direction of the drag operation (hereinafter, a "call permission direction") can be designated, or an area including an end point of the drag operation (hereinafter, a "call permission area") can be designated.

When the direction of the drag operation is designated as the call permission operation, answering the call is permitted when the direction of the input operation on the incoming call screen matches the call permission direction, and otherwise, the input of the drag operation is received again without permitting answering the call.

When the area including the end point of the drag operation is designated as the call permission operation, answering the call is permitted when the end point of the input operation on the incoming call screen falls within the call permission area, and otherwise, the input of the drag operation is received again without permitting answering the call.

The setting unit 220 includes a setting-screen display unit 221, a storing unit 222, an effective-time storing unit 223, and an emergency-contact storing unit 224.

The setting-screen display unit 221 outputs a screen for setting the call permission direction or the call permission area, and the storing unit 222 stores the call permission direction (e.g., a drag operation direction) or the call permission area (e.g., the area including the end point of the drag operation) inputted from the user on the setting screen.

In some embodiments, a common operation content can be set for all the contacts stored in a contact list of the mobile terminal 1 as the call permission operation. In some embodiments, different operation content can be set for each individual contact or each individual contact group stored in a contact list of the mobile terminal 1 as the call permission operation.

The individual contact means each contact number stored in the contact list, and the individual contact group means a group of contacts grouped by a predetermined category (e.g., family, friend, and the like).

When setting the call permission operation for each individual contact or each individual contact group, the contact or the contact group can be stored together with corresponding information on the call permission operation in the storing unit 222.

The effective-time storing unit 223 sets and stores a time from the first touch operation to completion of the input of the effective drag operation (hereinafter, "effective time"). The effective time is an allowed time for receiving the input of the call permission operation, which is determined, for example, to be an elapsed time since the first touch operation of the user. In some embodiments, the effective time is determined to be an elapsed time since the incoming call is received.

The emergency-contact storing unit 224 stores emergency contact information that is set to allow any person to answer the call.

The cancel processing unit 230 includes an emergency-call executing unit 231 and a switching unit 232.

The emergency-call executing unit 231 cancels the function of the call-permission processing unit 210 (function of the security call button) or allows the normal incoming call screen without displaying the security call button, when there is a call from the emergency contact stored in the emergency-contact storing unit 224.

When canceling the function of the call-permission processing unit 210, anyone can answer the call with an input of any operation regardless of the position of the touch operation or the position, the direction, or the end point of the drag operation.

A method of answering a call on the normal incoming call screen provided by a manufacturer of the mobile terminal 1 generally includes dragging of the call icon in a direction set by the manufacture of the mobile terminal 1, e.g., dragging the call icon toward the call end icon.

Further, depending on a user setting, preset incoming call mode information including the cancel of the function of the call-permission processing unit 210 or the display of the normal incoming call screen and the corresponding emergency contact information can be stored in the emergency-contact storing unit 224.

The switching unit 232 stores a password for switching to a normal call operation set by the user, and when the password is inputted from outside via a remote connection, switches to the normal call mode.

The call-rejection processing unit 240 rejects the call when no operation is inputted for the effective time stored in the effective-time storing unit 223 since the first touch operation of the user on the touch screen 101. In some embodiments, the call-rejection processing unit 240 rejects the call when no operation is inputted for the effective time stored in the effective-time storing unit 223 since the incoming call is received.

Further, in some embodiments, the call-rejection processing unit 240 rejects the call when a drag operation in a predetermined direction (e.g., a lateral (horizontal) direction) is inputted by the user, which is performed to answer a call on the normal incoming call screen. In some embodiments, the call-rejection processing unit 240 rejects the call when a drag operation in a predetermined operation performed in a predetermined area from an edge of the touch screen (e.g., an area within 1 centimeter from the edge) is inputted, which is barely used in a normal operation.

Figure 3:
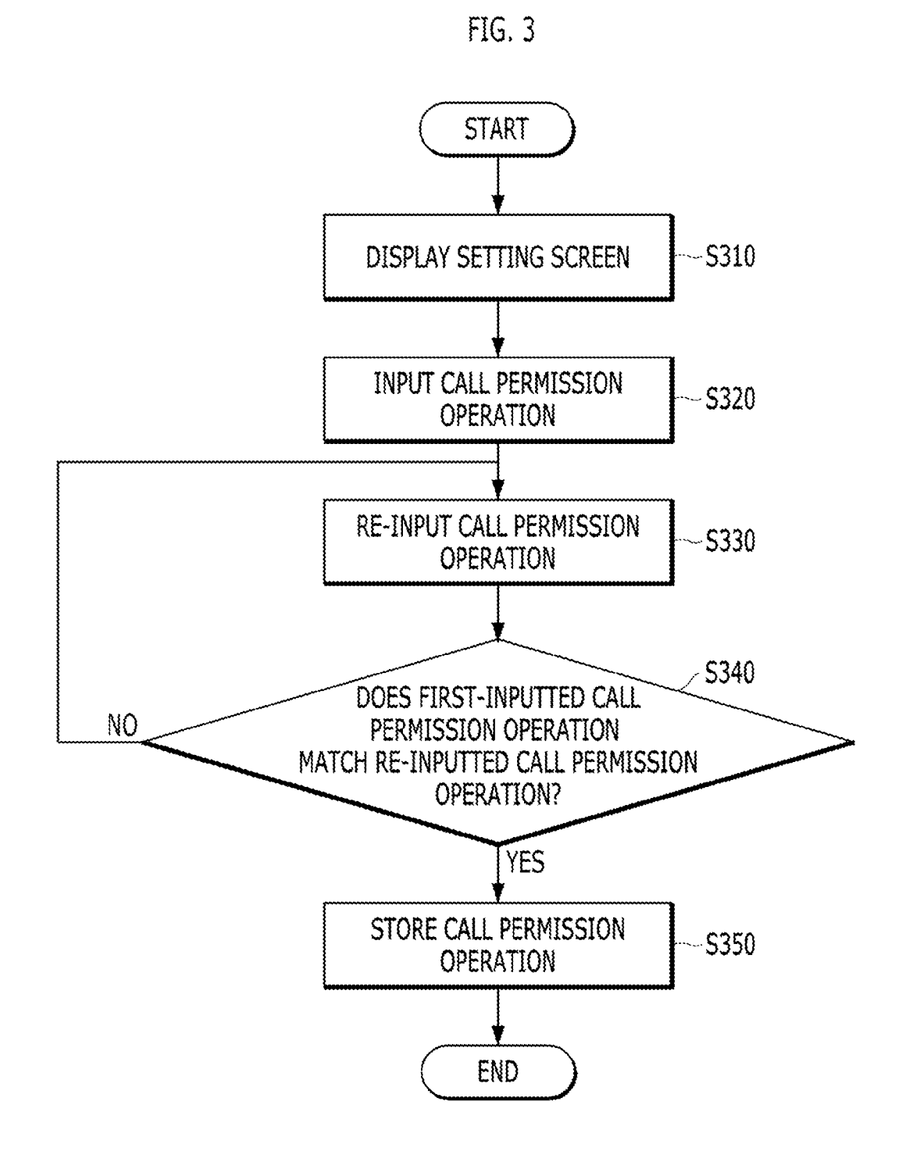
FIG. 3 is a flowchart of a method of setting a call permission operation according to some embodiments of the present invention.

FIG. 3 is a flowchart of a method of setting a call permission operation according to some embodiments of the present invention.

As shown in FIG. 3, in the method of setting the call permission operation according to some embodiments, the setting-screen display unit 221 displays a call-permission-operation setting screen on the touch screen 101. In some embodiments, the setting-screen display unit 221 displays only the incoming call icon on the call-permission-operation setting screen. In some embodiments, the setting-screen display unit 221 displays the incoming call icon and a direction guide when the call permission direction is set as the call permission operation, and displays the incoming call icon and a call permission area when the call permission area is set as the call permission operation.

The setting unit 220 receives the call permission operation from the user via the touch screen 101, and temporarily stores the received call permission operation in the storing unit 222 (Step S320). The setting unit 220 receives a plurality of inputs of the same operation in order to verify the inputted call permission operation (Step S330). The setting unit 220 compares the operation inputted at Step S320 with the operation inputted at Step S330 (Step S340), repeats Step S330 when the two operations do not match each other, and stores the inputted operation as the call permission operation in the storing unit 222 when the two operations match each other (Step S350).

Figure 4:
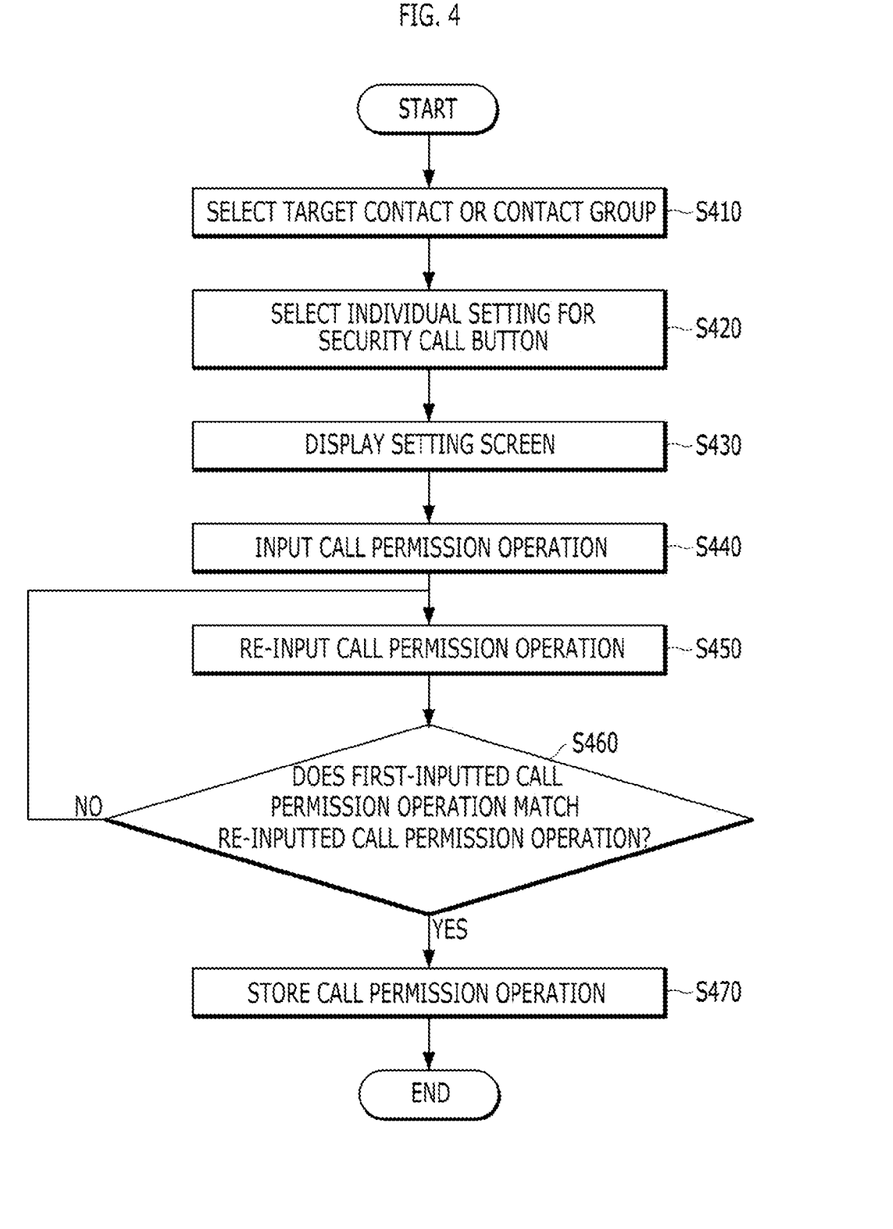
FIG. 4 is a flowchart of a method of setting a call permission operation for each contact or contact group according to some embodiments of the present invention.

FIG. 4 is a flowchart of a method of setting a call permission operation for each contact or contact group according to some embodiments of the present invention.

As shown in FIG. 4, in the method of setting a call permission operation for each contact or contact group, a contact or a contact group for setting the call permission operation is selected by the user on the touch screen 101 (Step S410). When setting the same call permission operation for all the contacts in the contact list, in the same manner as the example shown in FIG. 3, the step of selecting the contact or the contact group can be omitted.

When the individual setting is selected for the selected contact or contact group (Step S420), the setting-screen display unit 221 displays the call-permission-operation setting screen on the touch screen 101 (Step Step S430). The setting-screen display unit 221 displays the incoming call icon on the call-permission-operation setting screen, when the call permission direction is set as the call permission operation, further displays a direction guide, and when the call permission area is set as the call permission operation, further displays a candidate area for the call permission area.

The setting unit 220 receives a predetermined operation from the user on the touch screen 101, and temporarily stores the received operation in the storing unit 222 (Step S440). The setting unit 220 further receives a plurality of the same operations in order to verify the received operation (Step S450). The setting unit 220 compares the operation received at Step S440 with the operation received at Step S450 (Step S460), repeats Step S450 when the two operations do not match each other, and stores the received operation as the call permission operation in the storing unit 222 when the two operations match each other (Step S470). In some embodiments, the setting unit 220 stores the contact or the contact group designated at Step S410 together with the received operation.

Figure 5:
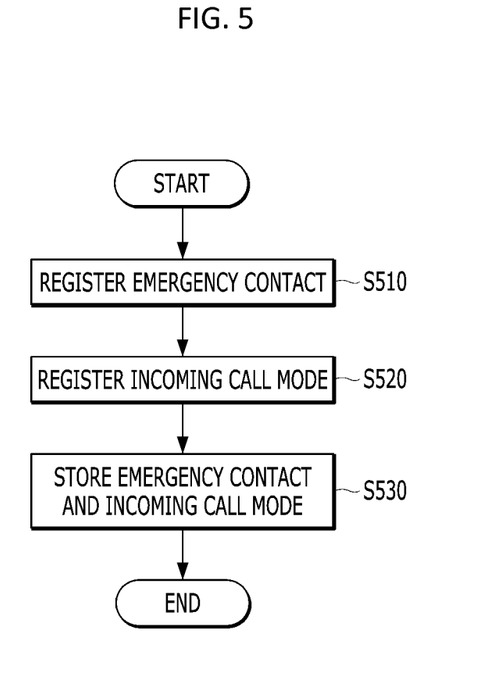
FIG. 5 is a flowchart of a method of setting an emergency contact according to some embodiments of the present invention.

FIG. 5 is a flowchart of a method of setting an emergency contact according to some embodiments of the present invention.

When the owner has lost the mobile terminal 1 such as a smartphone, it may be desired to set a way of canceling the function of the security call button to allow anyone to answer the call.

To this end, as shown in FIG. 5, the user can select an emergency contact from the contact list or input an emergency contact to allow a person around the mobile terminal 1 to receive a call by sending a call to the lost mobile terminal 1 (Step S510). At this time, the user can set one or a plurality of emergency contacts. Thereafter, the user selects an incoming call mode for the call received from the emergency contact (Step S520). The incoming call mode includes a normal call mode and a security-call-button cancel mode. In the normal call mode, the normal incoming call screen is displayed, and the call can be received by dragging the call icon in the lateral direction on the normal incoming call screen. In the security-call-button cancel mode, any touch operation on any area of the touch screen 101 or a drag operation in any direction allows the user or anyone to answer the call. When the emergency contact and the incoming call mode are inputted by the user, the emergency contact and the corresponding incoming call mode are stored in at least one of the emergency-contact storing unit 224 or the server 150 (Step S530).

Figure 6:
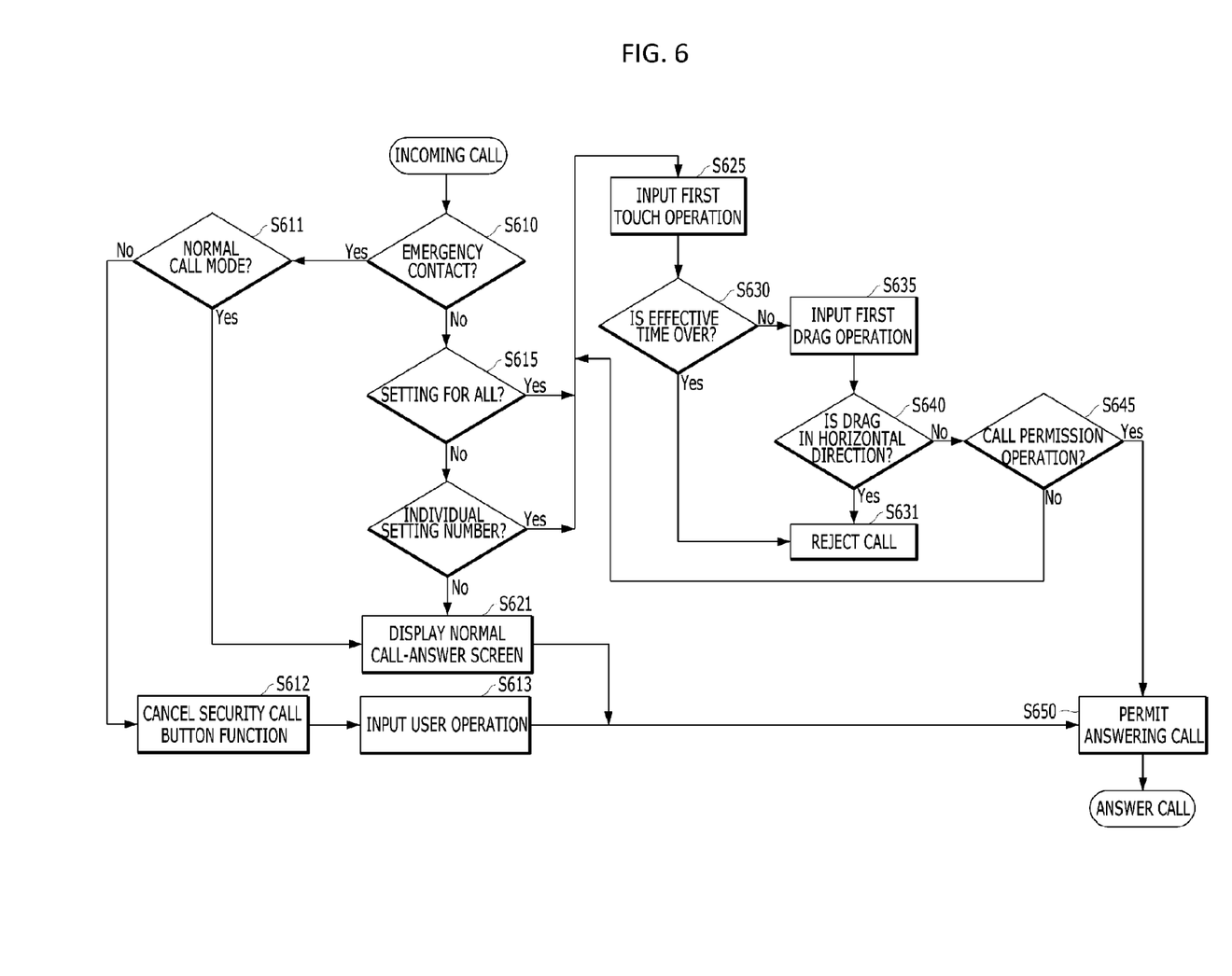
FIG. 6 is a flowchart of a call-answer control method according to some embodiments of the present invention.

FIG. 6 is a flowchart of a call-answer control method according to some embodiments of the present invention.

As shown in FIG. 6, when there is an incoming call, the incoming call number is compared with the emergency contact stored in the emergency-contact storing unit 224 or the server 150 (Step S610). When it is determined that the incoming call number matches the emergency contact, it is determined whether the incoming call mode set in the emergency-call executing unit 231 of the cancel processing unit 230 is the normal call mode or the security-call-button cancel mode (Step S611). When the incoming call mode is the normal call mode, the normal incoming call screen is displayed (S621). When the incoming call mode is the security-call-button cancel mode, the function of the security call button is canceled (Step S612), and when any operation is inputted from the user (Step S613), the call is received regardless of the position of the touch operation or the direction of the drag operation.

When the incoming call number does not match the registered emergency contact, it is determined whether or not the function of the security call button is set for all the contacts at the storing unit 222 of the setting unit 220 (Step S615), and when the function of the security call button is not set for all the contacts, it is determined whether the function of the security call button is set for an individual number (Step S620). When it is determined that the function of the security call button is not set for the individual number, either, the normal incoming call screen is displayed (Step S621), and the user is allowed to answer the call by way of the normal operation on the normal incoming call screen.

When the function of the security call button is set for all the contact stored in the contact list or the phone number of the incoming call is one of the contacts or is the one belongs to a contact group, the call-permission processing unit 210 executes the function of the security call button.

In some embodiments, when the function of the security call button is executed, only the incoming call icon is displayed on the touch screen 101. Thereafter, the first touch operation is inputted by the user in a state in which only the incoming call icon is displayed on the touch screen 101 (Step S625). The touch operation means a contact on the touch screen 101 by using a finger of the user or a stylus pen. It is checked whether the effective time has elapsed after the touch operation is inputted (Step S630), and when no operation is inputted until the effective time elapses since the first touch operation is inputted, the call-rejection processing unit 240 rejects the call (Step S631).

When a first drag operation is inputted within the effective time since the first touch operation is inputted on the touch screen 101 (Step S635), it is determined whether or not the first drag operation is a drag operation in the lateral direction (Step S640). When the first drag operation is a drag operation in the lateral direction, the call-rejection processing unit 240 rejects the call (Step S631). When the first drag operation is not a drag operation in the lateral direction, the first operation is compared with the call permission operation stored in the storing unit 222 (Step S645), and when the first operation and the call permission operation do not match each other, the user is requested to input the first touch operation from scratch. When the first drag operation and the call permission operation match each other, the user is allowed to answer the call (Step S650).

Figure 7A:
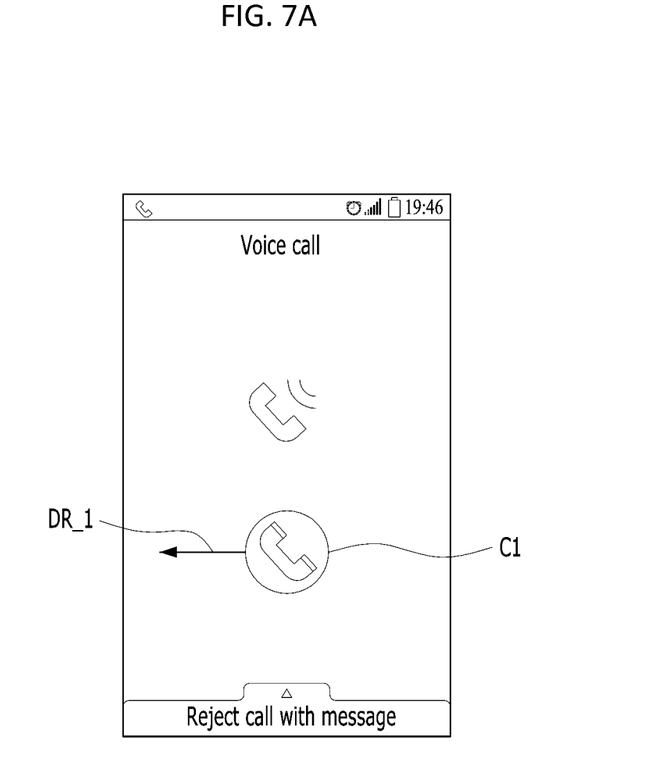
FIGS. 7A to 7C are schematic diagrams for illustrating an application example of a call-answer rejection method according to some embodiments of the present invention.
Figure 7B:
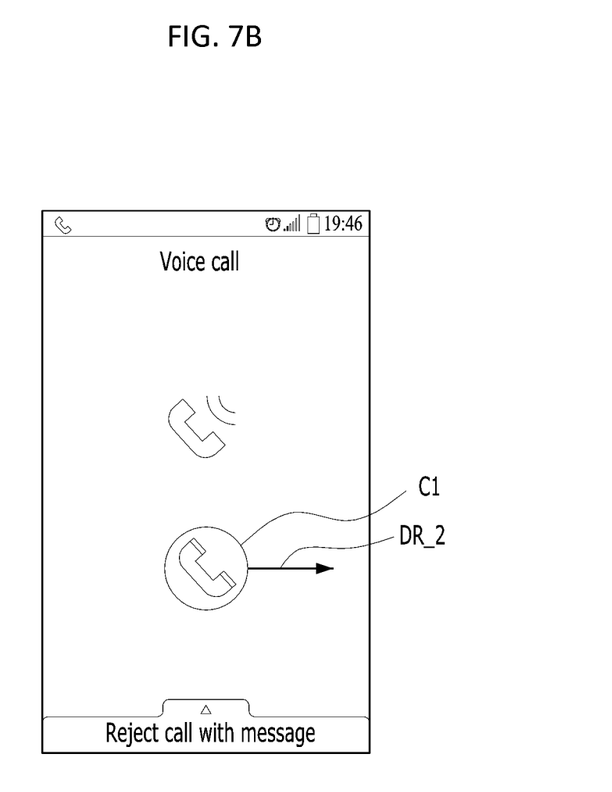
Figure 7C:
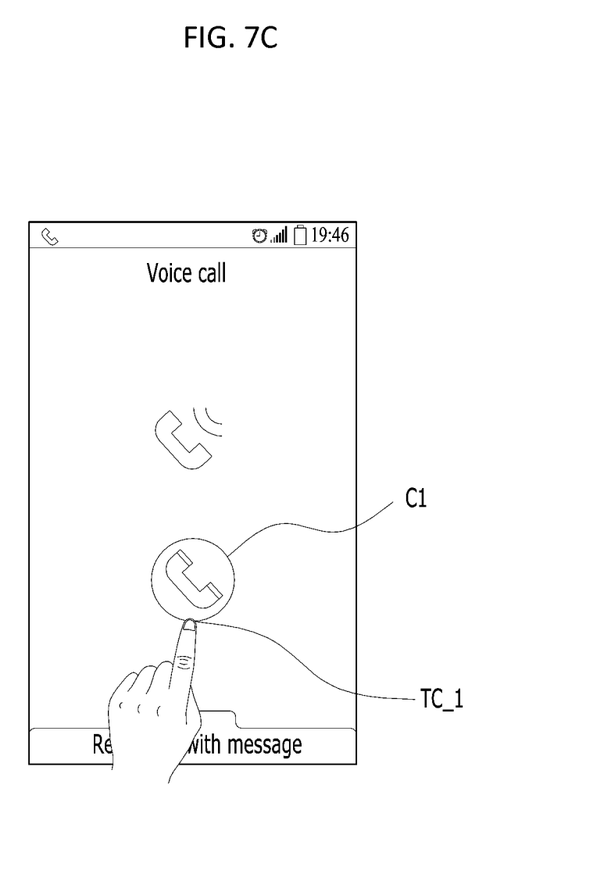

FIGS. 7A to 7C are schematic diagrams for illustrating an application example of a call-answer rejection method according to some embodiments of the present invention.

As shown in FIGS. 7A to 7C, when there is an incoming call, if a drag operation (DR_1, DR_2) in the lateral direction or only a touch operation (TC_1) is inputted in a state in which an incoming call icon (CI) is displayed, the call-rejection processing unit 240 rejects the call.

Figure 8A:
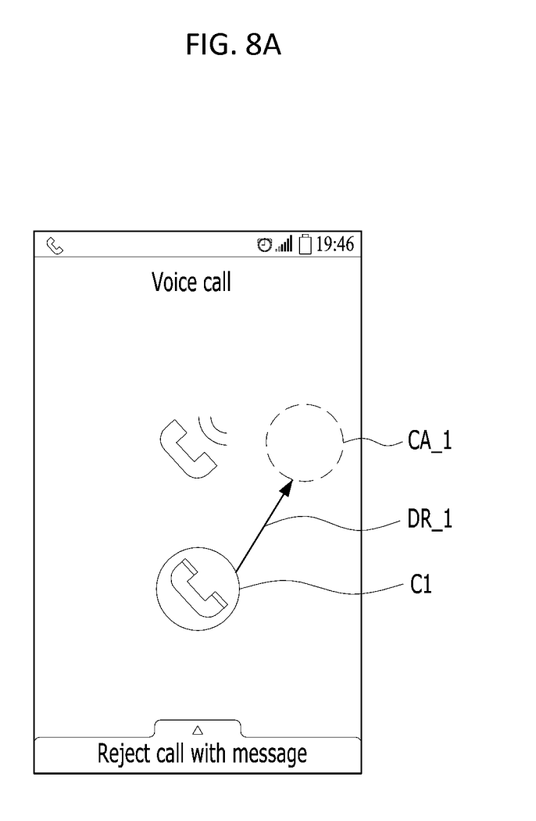
FIGS. 8A and 8B are schematic diagrams for illustrating an application example of a call-answer permission method according to some embodiments of the present invention.
Figure 8B:
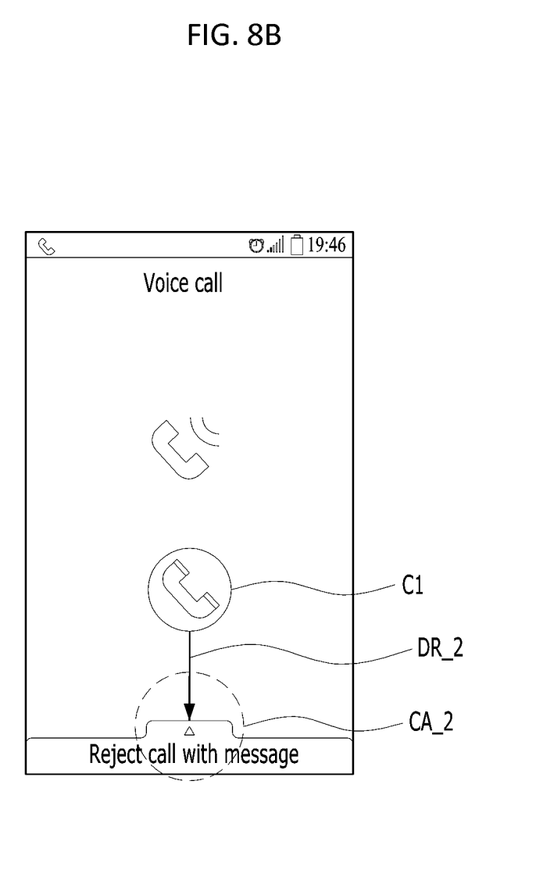

FIGS. 8A and 8B are schematic diagrams for illustrating an application example of a call-answer permission method according to some embodiments of the present invention.

As shown in FIGS. 8A and 8B, when there is an incoming call and the incoming call icon (CI) is displayed, the user is allowed to answer the call by way of the drag operation (DR_1, DR_2) to a direction matching the call permission operation corresponding to the incoming call number (when the call permission direction is set) or to an area matching the call permission operation corresponding to the incoming call number (when the call permission area is set).

That is, the user can answer the call by way of the direction of the drag operation (DR_1, DR_2) when the call permission direction is set, and by way of the drag operation (DR_1, DR_2) to the call permission area (CA_1, CA_2) when the call permission area is set.

As described above, the apparatus for controlling answering a call, according to some embodiments of the present invention, includes a display unit configured to display an incoming call icon when receiving a call signal, the incoming call icon differing from a call answer icon and a call end icon of a normal incoming call screen, a touch screen configured, upon the display unit displaying the incoming call icon, to receive an input of a predetermined operation with respect to the incoming call icon from a user, and a control unit including a call-permission processing unit configured to compare the predetermined operation with a preset call permission operation set in advance with respect to the incoming call icon and to permit answering the call when the predetermined operation matches the preset call permission operation.

Further, the method of controlling answering a call, according to some embodiments of the present invention, includes displaying an incoming call icon when receiving a call signal, the incoming call icon differing from a call answer icon and a call end icon of a normal incoming call screen, receiving, upon the display unit displaying the incoming call icon, an input of a predetermined operation with respect to the incoming call icon from a user, comparing the predetermined operation with a preset call permission operation set in advance with respect to the incoming call icon, and permitting answering the call when the predetermined operation matches the preset call permission operation.

Moreover, the mobile terminal, according to some embodiments of the present invention, includes the above mentioned apparatus and method.

In some embodiments, the predetermined operation inputted on the incoming call screen by the user includes at least one of touch, drag, tapping, or flipping with a predetermined pattern starting from the incoming call icon.

In some embodiments, the predetermined pattern includes at least one of time, cycle, direction, speed, or strength of performing the at least one of the touch, the drag, the tapping, or the flipping.

For example, a pattern including time, cycle, speed, or strength of a touch operation, a pattern including time, cycle, direction, speed, or strength of a drag operation, a pattern including cycle, speed, or strength of a tapping operation, a pattern including cycle, speed, or strength of a flipping operation, and any combination thereof can be used as the predetermined pattern.

As described above, the call-answer control apparatus, the call-answer control method, and the mobile terminal according to some embodiments of the present invention can solve the security problem by disabling anyone other than the owner of the mobile terminal to answer a call even when there is an incoming call during the owner's absence, by way of a predetermined operation set in advance by the user on an incoming call screen.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for controlling answering a call, the apparatus comprising:
 a display unit configured, when a call signal is received,
  to display a call answer icon and a call end icon of a normal incoming call screen in a normal call mode, and
  to display a security call button differing from the call answer icon and the call end icon of the normal incoming call screen in a security call button mode;
 a touch screen configured, upon the display unit displaying the security call button in the security call button mode or the call answer icon and the call end icon in the normal call mode, to receive an input of a predetermined operation on the security call button in the security call button mode or on the call answer icon and the call end icon in the normal call mode from a user; and
 a control unit including a call-permission processing unit configured
  in the normal call mode, to compare the received input of predetermined operation with a first call permission operation set in advance with respect to the call answer icon and the call end icon and to permit answering the call when the received input of predetermined operation performed on the call answer icon and the call end icon by the user matches the first call permission operation, and
  in the security call button mode, to compare the received input of predetermined operation with a second call permission operation set in advance with respect to the security call button and to permit answering the call when the received input of predetermined operation performed on the security call button by the user matches the second call permission operation,
 wherein, when the call signal is from a specific contact set in advance, the control unit is configured to permit answering the call with any operation on the touch screen in the security call button mode, and
 wherein
  the control unit further includes a setting unit configured to set the second call permission operation with respect to the security call button,
  the setting unit includes
   a setting-screen display unit configured to display a setting screen for setting the second call permission operation, and
   a call-permission-operation storing unit configured
    to receive an input of the second call permission operation through the setting screen from the user, and
    to store the second call permission operation, and
  the call-permission processing unit is configured
   to compare the received input of predetermined operation with the second call permission operation stored in the call permission operation storing unit, and
   to permit answering the call when the received input of predetermined operation matches the second call permission operation stored in the call permission operation storing unit.

2. The apparatus according to claim 1, wherein the control unit further includes
 an effective time storing unit configured
  to set an effective time from a touch on the touch screen until the received input of the predetermined operation is completed, and
  to store the effective time, and
 a call-rejection processing unit configured, when the received input of the predetermined operation is not completed from the touch on the touch screen until the effective time is over, to reject the call.

3. The apparatus according to claim 1, wherein
 the control unit further includes a contact list including at least one of a contact or a contact group, and
 the second call permission operation is differently settable for each contact or each contact group stored in the contact list.

4. The apparatus according to claim 1, wherein the predetermined operation includes at least one of touch, drag, tapping, or flipping with a predetermined pattern starting from the security call button.

5. The apparatus according to claim 4, wherein the predetermined pattern includes at least one of time, cycle, direction, speed, or strength of performing the at least one of the touch, the drag, the tapping, or the flipping.

6. The apparatus according to claim 1, wherein the display unit is configured to display the security call button on the normal incoming call screen.

7. The apparatus according to claim 1, wherein the display unit is configured to display the security call button instead of the call answer icon and the call end icon of the normal incoming call screen.

8. A mobile terminal, comprising the apparatus according to claim 1.

9. A method of controlling answering a call, the method comprising:
 displaying a call answer icon and a call end icon of a normal incoming call screen in a normal call mode and displaying a security call button differing from the call answer icon and the call end icon of the normal incoming call screen in a security call button mode;
 receiving, upon the display unit displaying security call button in the security call button mode or the call answer icon and the call end icon in the normal call mode, an input of a predetermined operation on the security call button in the security call button mode or on the call answer icon and the call end icon in the normal call mode from a user;
 in the normal call mode, comparing the received input of predetermined operation with a first call permission operation set in advance with respect to the call answer icon and the call end icon and permitting answering the call when the received input of predetermined operation performed on the call answer icon and the call end icon by the user matches the first call permission operation;

in the security call button mode, comparing the received input of predetermined operation with a second call permission operation set in advance with respect to the security call button and permitting answering the call when the received input of predetermined operation performed on the security call button by the user matches the second call permission operation; and when the call signal is from a specific contact set in advance, permitting answering the call with any operation on the touch screen in the security call button mode; and setting the second call permission operation with respect to the security call button, wherein the setting includes displaying a setting screen for setting the second call permission operation, receiving an input of the second call permission operation through the setting screen from the user, and storing the second call permission operation, wherein the comparing includes comparing the received input of predetermined operation with the second call permission operation stored at the storing, and wherein the permitting includes permitting answering the call when the received input of predetermined operation matches the second call permission operation stored at the storing.

10. The method according to claim 9, further comprising:

setting and storing an effective time from a touch on the touch screen until the input of the predetermined operation is completed; and rejecting the call, when the input of the predetermined operation is not completed from the touch on the touch screen until the effective time is over.

11. The method according to claim 9, wherein the second call permission operation is differently settable for each contact or each contact group stored in a contact list.

12. The method according to claim 9, wherein the predetermined operation includes at least one of touch, drag, tapping, or flipping with a predetermined pattern starting from the security call button.

13. The method according to claim 12, wherein the predetermined pattern includes at least one of time, cycle, direction, speed, or strength of performing the at least one of the touch, the drag, the tapping, or the flipping.

14. The method according to claim 9, wherein the displaying includes displaying the security call button on the normal incoming call screen.

15. The method according to claim 9, wherein the displaying includes displaying the security call button instead of the call answer icon and the call end icon of the normal incoming call screen.

16. An apparatus for controlling answering a call, the apparatus comprising:

a display unit configured, when a call signal is received, to display a call answer icon and a call end icon of a normal incoming call screen in a normal call mode, and to display a security call button differing from the call answer icon and the call end icon of the normal incoming call screen in a security call button mode;

a touch screen configured, upon the display unit displaying the security call button in the security call button mode or the call answer icon and the call end icon in the normal call mode, to receive an input of a predetermined operation on the security call button in the security call button mode or on the call answer icon and the call end icon in the normal call mode from a user; and a control unit including a call-permission processing unit configured in the normal call mode, to compare the received input of predetermined operation with a first call permission operation set in advance with respect to the call answer icon and the call end icon and to permit answering the call when the received input of predetermined operation performed on the call answer icon and the call end icon by the user matches the first call permission operation, and in the security call button mode, to compare the received input of predetermined operation with a second call permission operation set in advance with respect to the security call button, and to permit answering the call when the received input of predetermined operation performed on the security call button by the user matches the second call permission operation, wherein when the call signal is from a specific contact set in advance, the control unit is configured to display the call answer icon and the call end icon instead of displaying the security call button in the security call button mode, and wherein the control unit further includes a setting unit configured to set the second call permission operation with respect to the security call button, the setting unit includes a setting-screen display unit configured to display a setting screen for setting the second call permission operation, and a call-permission-operation storing unit configured to receive an input of the second call permission operation through the setting screen from the user, and to store the second call permission operation, and the call-permission processing unit is configured to compare the received input of predetermined operation with the second call permission operation stored in the call permission operation storing unit, and to permit answering the call when the received input of predetermined operation matches the second call permission operation stored in the call permission operation storing unit.

* * * * *